(12) United States Patent
Blanco et al.

(10) Patent No.: US 8,775,336 B2
(45) Date of Patent: Jul. 8, 2014

(54) INTERACTIVE INTERFACE FOR OBJECT SEARCH

(75) Inventors: Roi Blanco, Barcelona (ES); Peter Mika, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 325 days.

(21) Appl. No.: 13/330,405

(22) Filed: Dec. 19, 2011

(65) Prior Publication Data
US 2013/0159222 A1    Jun. 20, 2013

(51) Int. Cl.
*G06F 15/18* (2006.01)
(52) U.S. Cl.
USPC .......................................................... 706/12
(58) Field of Classification Search
USPC .......................................................... 706/12
See application file for complete search history.

(56) References Cited

U.S. PATENT DOCUMENTS

| 8,099,406 | B2 * | 1/2012 | Lee ................................ 707/706 |
| 8,135,707 | B2 * | 3/2012 | Mika .............................. 707/723 |
| 8,156,053 | B2 * | 4/2012 | Mika et al. ....................... 706/12 |

OTHER PUBLICATIONS

Jeffrey Dalton, Peter Mika, and Roi Blanco, "Coreference Aware Web Object Retrieval," SIGIR 2011 conference submission.
Steve Rosenbaum, "Why Content Curation is Here to Stay," May 3, 2010.

* cited by examiner

*Primary Examiner* — Michael B Holmes
(74) *Attorney, Agent, or Firm* — Michael J. Buchenhorner

(57) ABSTRACT

Editorial curation of search results includes: receiving a search results page rendered in response to a search query; receiving user edits to the search results page, the user edits including changes to objects in the search results page; and applying the user edits to the search results page.

14 Claims, 15 Drawing Sheets

FIG. 3B

INTERACTIVE INTERFACE FOR OBJECT SEARCH

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of search and more particularly relates to the field of object search.

BACKGROUND OF THE INVENTION

Web search engines manage increasing amounts of structured data, which is typically represented in the form of objects described by a set of attributes and related to other objects through relations. The objects may be associated to web pages (typically, a search engine may extract a number of objects from a web page), or the search engine may handle only object data, without knowledge of the provenance of the objects. A typical task in these settings is to retrieve an object or a set of relevant objects in response to user queries of some form (keyword queries, structured queries or a hybrid).

Search Engine Background. A search engine allows client devices to search for files of interest in response to queries. The search engine may include a crawler component, an indexer component, an index data store, a search component, a ranking component, a cache, a profile data store to provide persistent storage for one or more user profiles, a logon component, a profile builder, and an application program interface ("API") that may be used to execute functions for storage, retrieval and manipulation of data in the index data store and profile data store. The search engine and its constituent components may be deployed across the network in a distributed manner whereby key components are duplicated and strategically placed throughout the network for increased performance, e.g., close to the edges of the network.

The term "Boolean search engine" refers to the use of Boolean-style syntax in a query by a user. A Boolean search engine allows the use of Boolean operators (such as AND, OR, NOT, and XOR) in a probabilistic context to specify the logical relationship between search terms. For example, the search query "college OR university" may return all results with either "college" or "university" or both, while the search query "college XOR university" may return only all results that have only "college" or "university" but not both.

In contrast to Boolean search, "semantic search" is a search technique intended to improve the relevance of search results by incorporating an understanding of the contextual meaning of search terms as well as the user's intent. Rather than using Boolean-style syntax to specify the relationship between search terms, semantic search attempts to infer the meaning of each individual word in a natural language search query. Semantic search applies "semantics" (the science of meaning in language) to retrieve information from richly structured data sources such as ontologies.

The search results located during a search of an index performed in response to a query received from a user will generally then be ranked. The index has a plurality of index entries, wherein each index entry has a weight. The query may include a plurality of query terms, wherein each query term corresponds to an index entry. Search results are sometimes ranked by scoring each located record according to the number of times portions of information corresponding to each query term occur in each record and the weight of each index entry corresponding to each occurring query term. Proximity of query terms within located records, and/or context or "semantic" information from the Semantic Web (stored with languages such as Resource Description Format (RDF) and RDF Schema (RDFS), or other variants of Extensible Markup Language (XML) or the like) may also be considered in weighing the score. The score and an identifier of each located record are then stored in a respective entry of a ranking list.

The entries of the ranking list are ordered according to the scores. The information associated with each located record may then be provided to the user in the order of the ranking list. For example, the provided information associated with each located record may be the score of each located record and/or the identifier of each located record.

User editable search interfaces have existed before, see e.g. Google's SearchWiki or Mahalo's user written search result pages. These examples relate to document search, where de-duplication removes only documents that are exactly the same, and this can be easily automated to its full extent. Editing search results consists in annotating or reordering search results, or writing an entirely new results page. In object search, de-duplication means identifying and merging (or removing) duplicate results that relate to the same real world object, which is more difficult, and practical implementations using Machine Learning require training data created by humans. In object search, the content of search results is structured and can be displayed in a way that makes it feasible for the user to edit parts of the Web document. Existing object search engines typically do not allow user feedback. Some search engines allow users to remove sources from object search results. When removing a source, all the results from that source are removed. These actions are not saved by the engine and are not applied to future searches.

An example of a vertical search engine is Yahoo! Local which searches over a curated collection of structured data for representing business listings sourced from multiple trusted data providers. Editorial curation is the term given to the human filtering and organizing of content on web sites. These vertical search engines don't have as much coverage, however, as Web search. See FIG. 1. An example of a structured search can be seen in Yahoo! Search when the user clicks on the "Local Business Listings" facet on the left bar after generating a search. This structured search is powered by information extracted by Yahoo! The search results shown in FIG. 1 are typical in that they feature duplicate listings 102-108.

SUMMARY OF THE INVENTION

Briefly, according to an embodiment of the present invention, a method for editorial curation of search results includes steps or acts of: receiving a search results page rendered in response to a search query; receiving user edits to the search results page, the user edits including changes to objects in the search results page; and applying the user edits to the search results page.

According to another embodiment of the present invention, a system for editorial curation of search results includes a memory and a processor device operably coupled to the memory for executing the method steps above. The system also includes an interface for accepting user edits.

In yet another embodiment of the present invention, a computer readable storage medium has stored therein instructions for executing the method steps above.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which:

FIG. 3B shows the search results page of FIG. 1 after a merge edit, according to another embodiment of the present invention;

FIG. 5 shows the results page of an object search engine;

FIG. 6 shows a results page with duplication in attribute values;

FIG. 7 shows a screen prompt, according to an embodiment of the present invention;

FIG. 8 shows a results page after a drag-and-drop operation, according to an embodiment of the present invention;

FIG. 9 shows a results page wherein the predicate exhibits two different values, according to an embodiment of the present invention;

FIG. 10 shows a results page with a new value added after a drag-and drop, according to an embodiment of the present invention;

FIG. 11 shows a results page after the new value of FIG. 10 has been added, according to an embodiment of the present invention;

FIG. 12 shows a results page where the attribute values are merged, according to an embodiment of the present invention;

Figure 1:
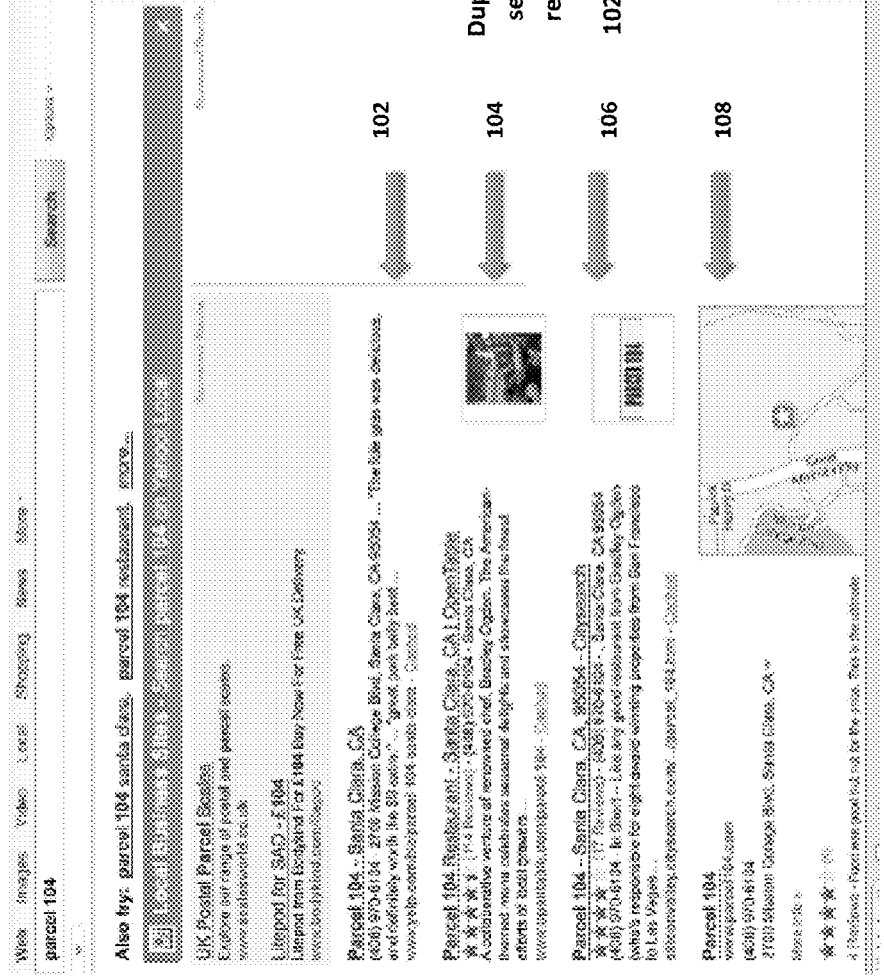
FIG. 1 is an exemplary screenshot of an example of vertical search in Yahoo! business listings, according to the known art.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In the following description, numerous specific details are set forth by way of exemplary embodiments in order to provide a more thorough description of the present invention. It will be apparent, however, to one skilled in the art, that the present invention may be practiced without these specific details. In other instances, well-known features have not been described in detail so as not to obscure the invention. The preferred embodiments of the inventions are described herein in the Detailed Description, Figures and Claims. Unless specifically noted, it is intended that the words and phrases in the specification and claims be given the ordinary and accustomed meaning as understood by those of skill in the applicable art. If any other meaning is intended, the specification will specifically state that a special meaning is being applied to a word or phrase.

We present a novel interface for object search that allows a search engine user to perform the tasks of disambiguation and editorial curation of data in a Web document. Object search answers a user's object query. Two key tasks in developing an object search engine is performing de-duplication (disambiguation) of objects and to correct existing information. Using this novel interactive interface, the search user can modify the attributes of objects and their relationships. The user can also drag-and-drop an object on another object to indicate duplicate search results. Similarly, the user can drag and drop individual attributes and relations on each other to indicate the equivalence of the attributes and relations, thus making the search results more meaningful.

The back end of the search engine collects such feedback to improve the underlying automated methods of object de-duplication and object ranking, and to improve data quality in general. It is ideally suited for the vertical search domain where the data is structured, such as restaurant listings, movie reviews, and so on. Object Search is a generalization of vertical search to a Web-scale scenario. The interactive interface according to an embodiment of the invention can be used in a vertical search scenario such as Yahoo! Local or Yahoo! Shopping, but it is particularly relevant to the case of object search on the Web, where editorial curation is problematic due to the size and heterogeneity of data.

Figure 2:
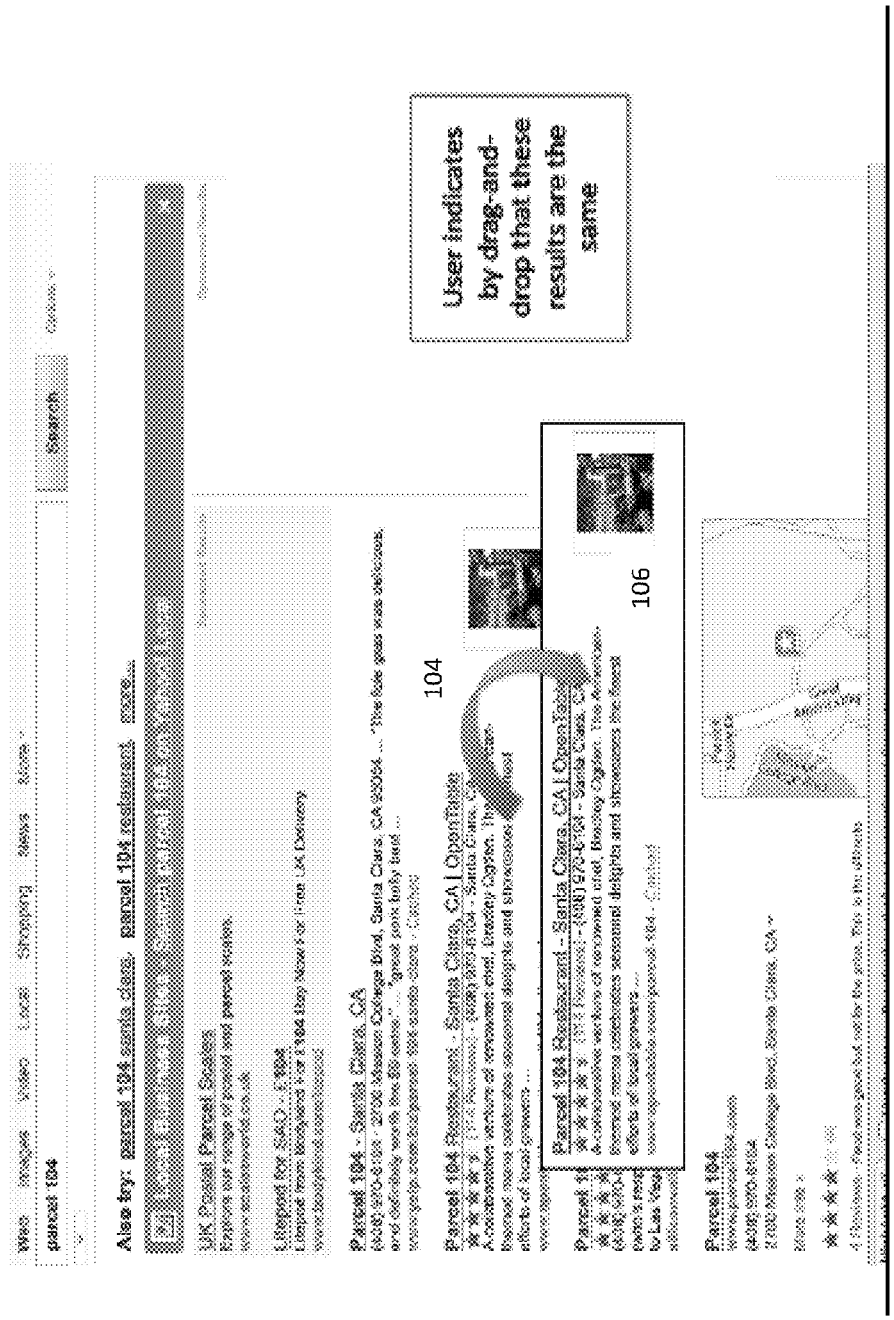
FIG. 2 shows the search results page of FIG. 1 with a drag-and-drop edit, according to an embodiment of the present invention
Figure 3A:
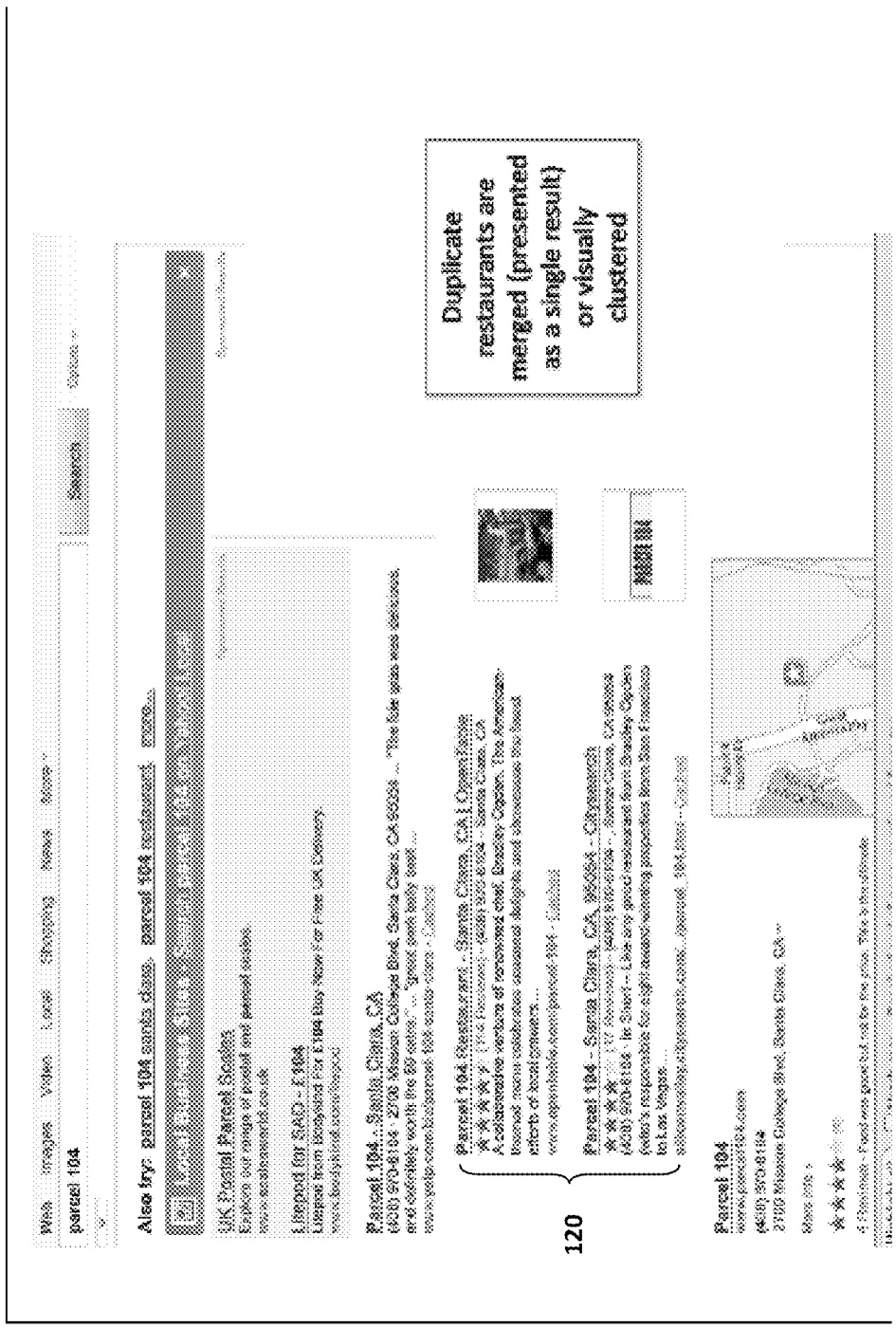
FIG. 3A shows the search results page of FIG. 1 after a merge edit, according to an embodiment of the present invention.
Figure 3B:
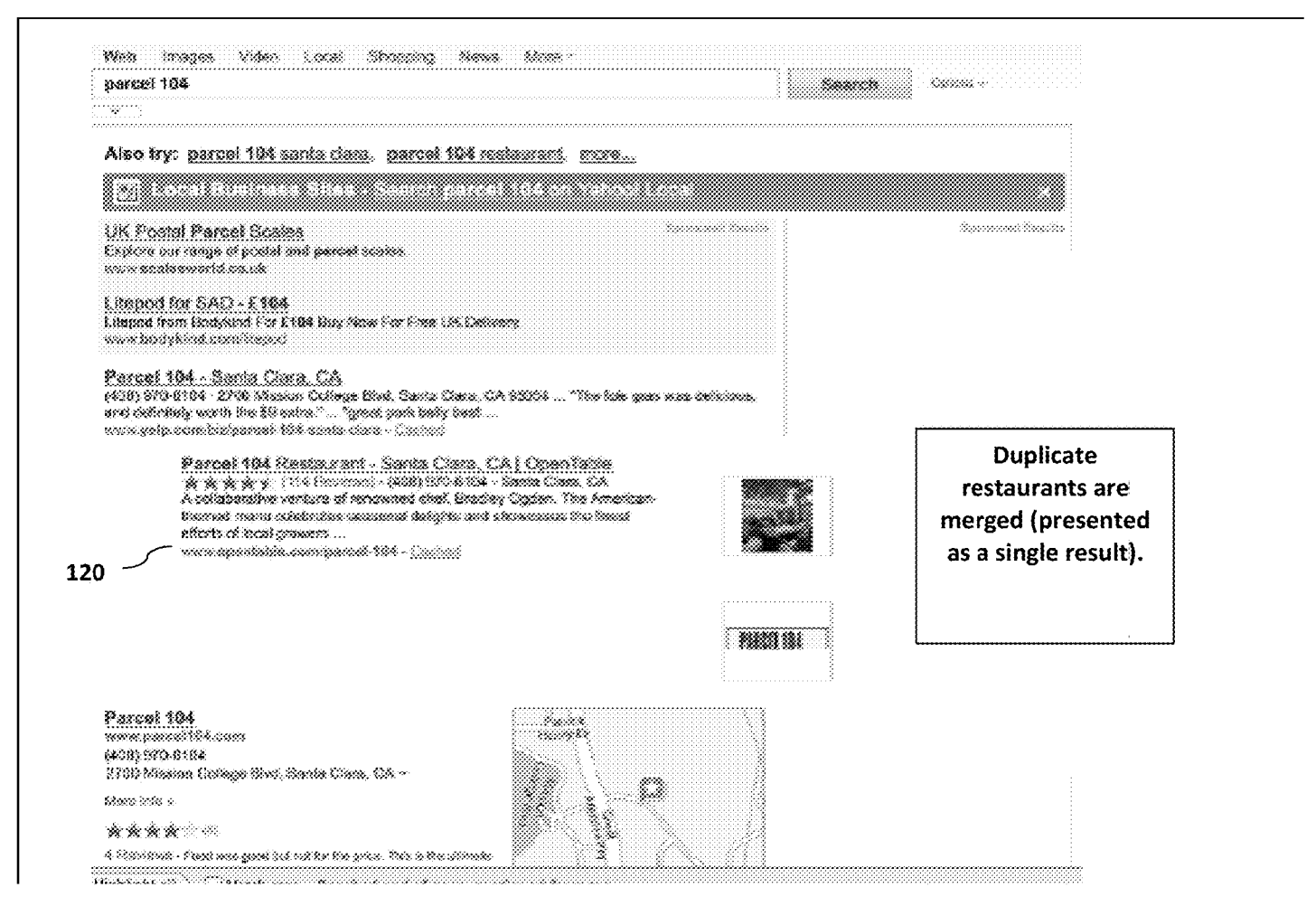

Referring to FIG. 2 there is shown a zoomed in view of the exemplary screenshot listing search results for a restaurant (Parcel 104) in Santa Clara, Calif. shown in FIG. 1. In this screenshot, the user has dragged and dropped duplicate search result 104 over listing 106 to indicate that these search result listings are duplicates. In FIGS. 3A and 3B we see two possible outcomes after the drag and drop of FIG. 2. In FIG. 3A the two search result listings 104 and 106 involved in the drag and drop are clustered and presented as one listing. In FIG. 3B, however, the two search result listing 104 and 106 are merged and presented as a single search result listing 120 (disambiguation). These figures, however, show only two of the possibilities where results marked as duplicates by users are clustered. Search results may be merged or only one of the duplicates may be kept.

Note that the invention is applicable to the case where the search is over structured datasets, such as datasets obtained from the Web through information extraction. The invention solves the problem of de-duplicating objects and maintaining data quality in an object search system. Known automated methods for de-duplication require training data, which is expensive to acquire editorially. Given the heterogeneity of the Web setting, it is also hard to find human resources for performing de-duplication in specialist domains, for example in the case of niche products.

In a web setting, the invention also solves the problem wherein data displayed by third-party web pages cannot be modified by users/visitors. For example, a user may not be able to correct outdated personal information (such as a physical or email address) displayed on a third-party website. The search engine provider may provide third parties a feed of the changes made by search users, which would encourage third parties to provide data in structured forms.

The system allows users of the search engine to indicate duplicate results, e.g. by drag-and-drop. The user may merge attributes or relations, in which case the two attributes/relations are recorded as equivalent. The user may also merge two values of the same attribute/relation to indicate that the values themselves are equivalent. In this case, the system prompts the user to keep one or both values or to replace them with a new value.

This choice may be guided by background knowledge. For example, if it's known that the attribute/relation can only take a single value, the user cannot choose to keep both values. The user may also merge an object with another object. In this case, existing properties that are the same or have been known to be equivalent from previous actions are merged as above. The interface also allows the user to edit object search results, by adding, deleting, or correcting attribute values, and introducing or removing relations.

In a keyword search over structured objects, we use the Resource Description Framework (RDF) to model the results (query-object pairing) as a series of triples (resource, property, value), also known as (subject, predicate, object). The values may contain textual content or refer to the URI (Uniform Resource Indicator) of other resources. To construct objects, triples are grouped by resource. Each property (also referred to as a predicate) is mapped onto fields which can then be tokenized where appropriate to support keyword matching.

In subsequent searches, the changes that the user has made may be applied to the search results where the same object appears, either for all users (global edit) or only for the user who made those changes (local edit). The system set-up is what determines if the changes are to be applied locally or globally. If the changes are local changes only, this means that the changes will appear for subsequent searches by the user who made the changes. The system is able to identify the user by known means such as a login feature or by cookies.

Automated learning will improve search engine results. The system may use the information provided by the user to learn the automated disambiguation of triples and objects using machine-learning techniques. A number of machine learning methods exist in the literature under the name 'record linkage' that allow the matching of objects and triples based on training data obtained from users. These models may be learned for each user separately from the data collected from only that user or for the collective of users from the data collected in aggregate.

For the search engine provider, the advantage is in gathering user feedback for improving object de-duplication and improving data quality through user curation. For the user, the benefit comes from being able to manually correct and improve object search results.

Figure 4:
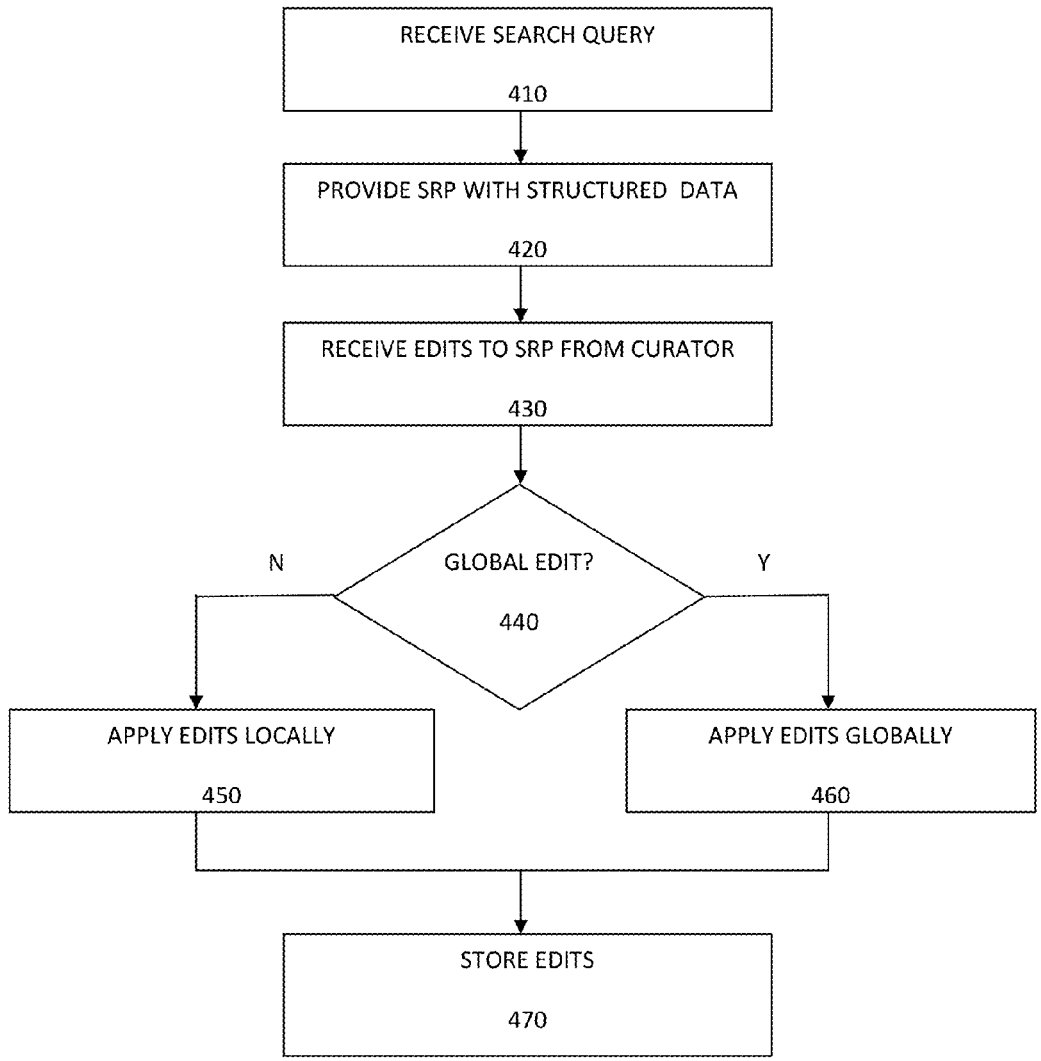
FIG. 4 is a flowchart of a method for object search, according to an embodiment of the present invention.

Referring now to FIG. 4 there is shown a flowchart 400 of a method for implementing an interactive interface for object search, according to an embodiment of the present invention. In Step 410, input is received. This input is a search query submitted by a user. In step 420 a search results page (SRP) containing structured data is provided in response to the search query. In Step 430 we receive edits to the structured data, provided by the user. The edits can be merges, drag-and-drop edits, and/or corrections. For example, the user can correct the search results by removing duplicates. Duplicates often occur because the data comes from different sources. In step 440 we first determine if the edits are to be applied globally or locally. If the edits are to be applied locally, in step 450 we apply the edits locally. Else, in step 460 we apply the edits globally. The edits are then stored in step 470.

A level of security could be introduced where only the business owner or other authorized individual can edit the results. Various mechanisms exist by which an entity is able to identify itself as the owner of the website. We leverage this technology quite easily in the case where the object search results have been extracted from a particular website. The system is able to restrict editing functionality to a user account owned by the verified owner of the website, or to a user account authorized by the verified owner of the website. As can easily be seen by one with knowledge in the art, various other forms of security can be implemented within the spirit and scope of the invention.

Using a drag-and-drop feature, the user can choose to merge similar results and merge and edit triples of the same result. Merges and edits are stored in a database, so when a query is executed the merge and edits are applied to the result set. Three paths can be taken with a drag-and-drop operation:

1. Triples with the same predicate and object are merged after appending their resource;

2. Triples with the same predicate and different objects— the user has three options here: a) he/she can select one of the objects to keep; b) he/she can select both values to keep; or c) he/she can enter a new value and change the object altogether.

3. Triples with different predicates and the same object— the user can select which predicate he/she prefers to keep.

Figure 5:
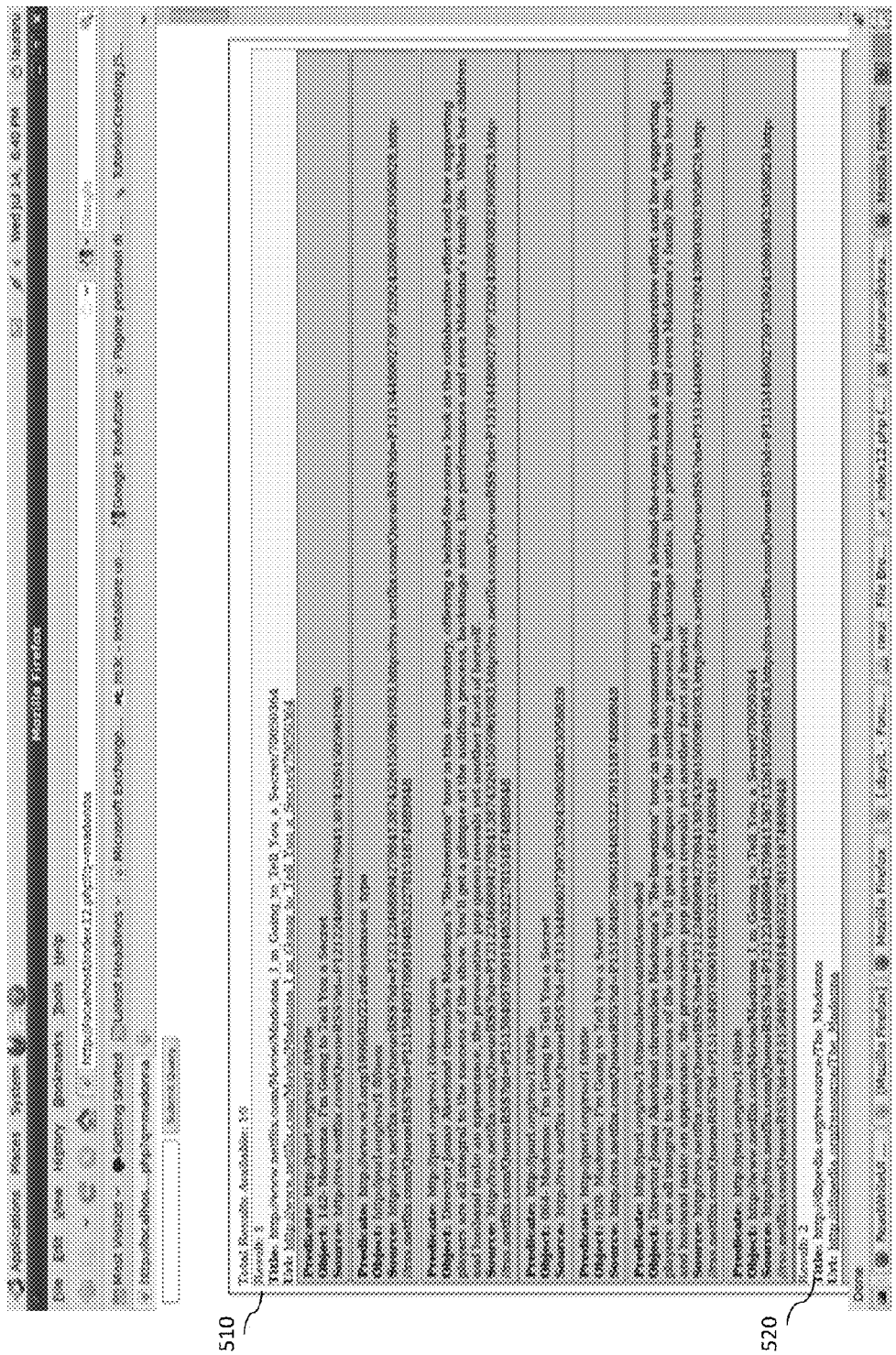
FIGS. 5 through 12 show screenshots of the user interface for object search and edit, according to embodiments of the present invention.

FIGS. 5 through 12 are examples of the user interface for applying edits to object search, according to the invention. The examples of FIGS. 5 through 12 show how the data is processed by the back-end of the search engine. FIG. 5 shows the results page of a possible implementation of an object search engine. In FIG. 5 we see two results for a query 510 and 520, each result consisting of a title, a URI, and a set of key/value pairs (displayed as Predicate and Object), where each key-value pair is also associated with the source from which the data was extracted.

Figure 6:
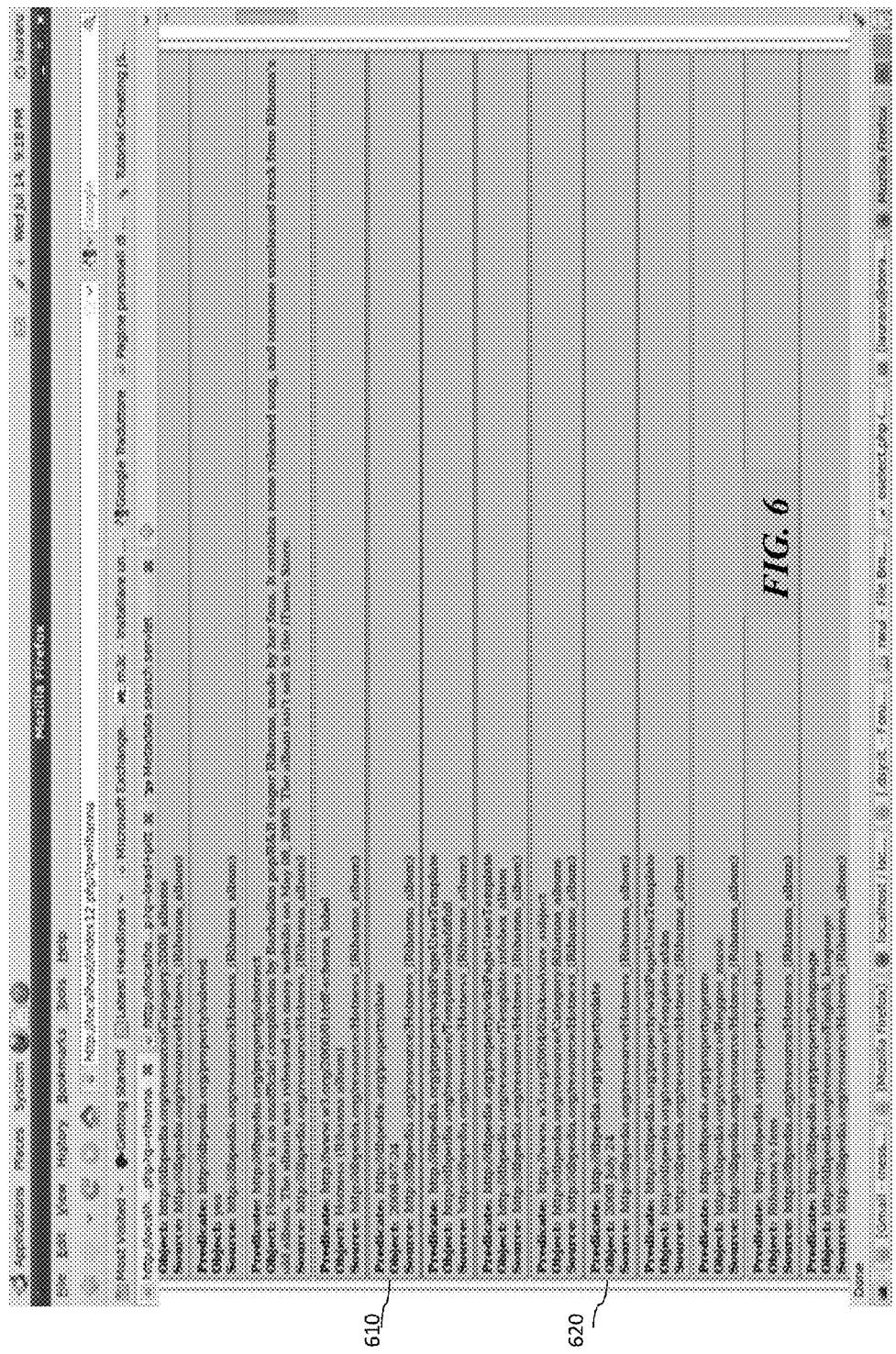
Figure 7:
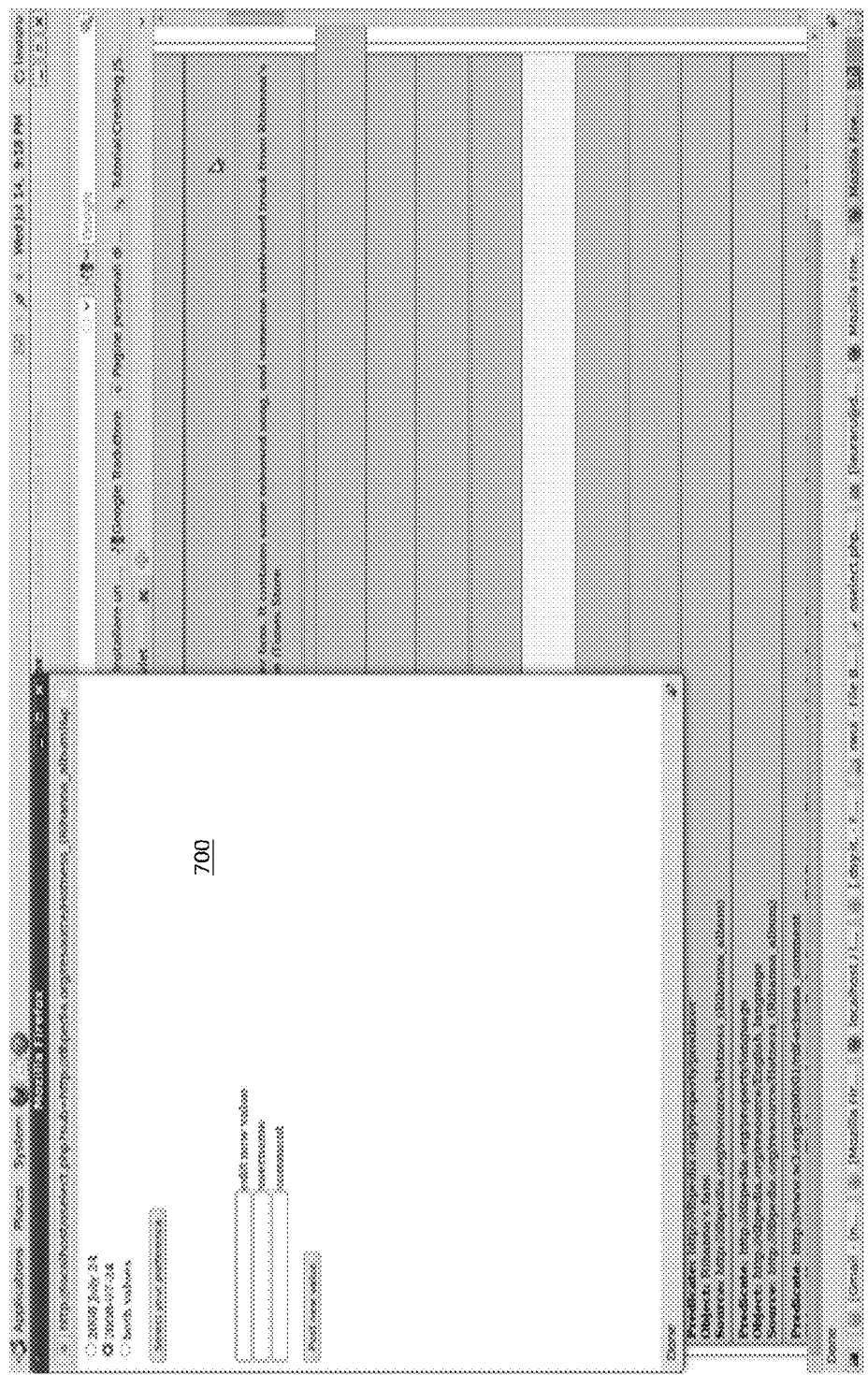

FIG. 6 shows an example of an object search result with duplication in attribute values. The value for the predicate "http://dbpedia.org/property/date" appears in the data as both Jul. 24, 2008 (object 610) and 2008 Jul. 24 (object 620). After dragging and dropping one key/value pair over the other, the user is prompted with the screen 700 shown in FIG. 7, where he/she can choose which value to keep (which value will be displayed). In this example the user has selected Jul. 24, 2008 (object 610 from FIG. 6) by clicking on the button associated with this value. Other means of selection, such as checkmarks, highlighting, and the like are also contemplated within the spirit and scope of the invention. Note that although in this particular case the two values are semantically equivalent, the properties could have different values, which could be either conflicting or valid alternatives.

Figure 8:
Figure 9:
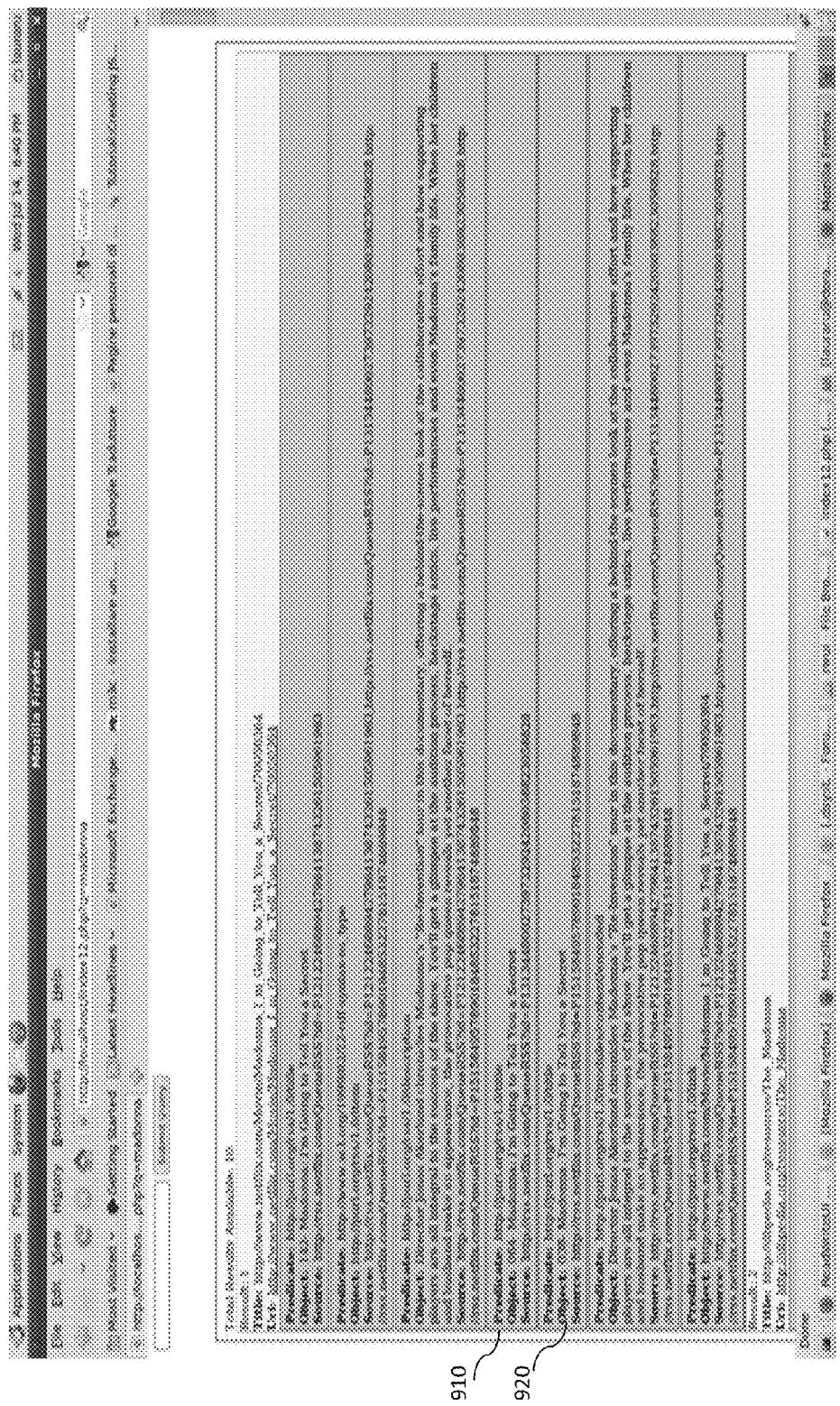
Figure 10:
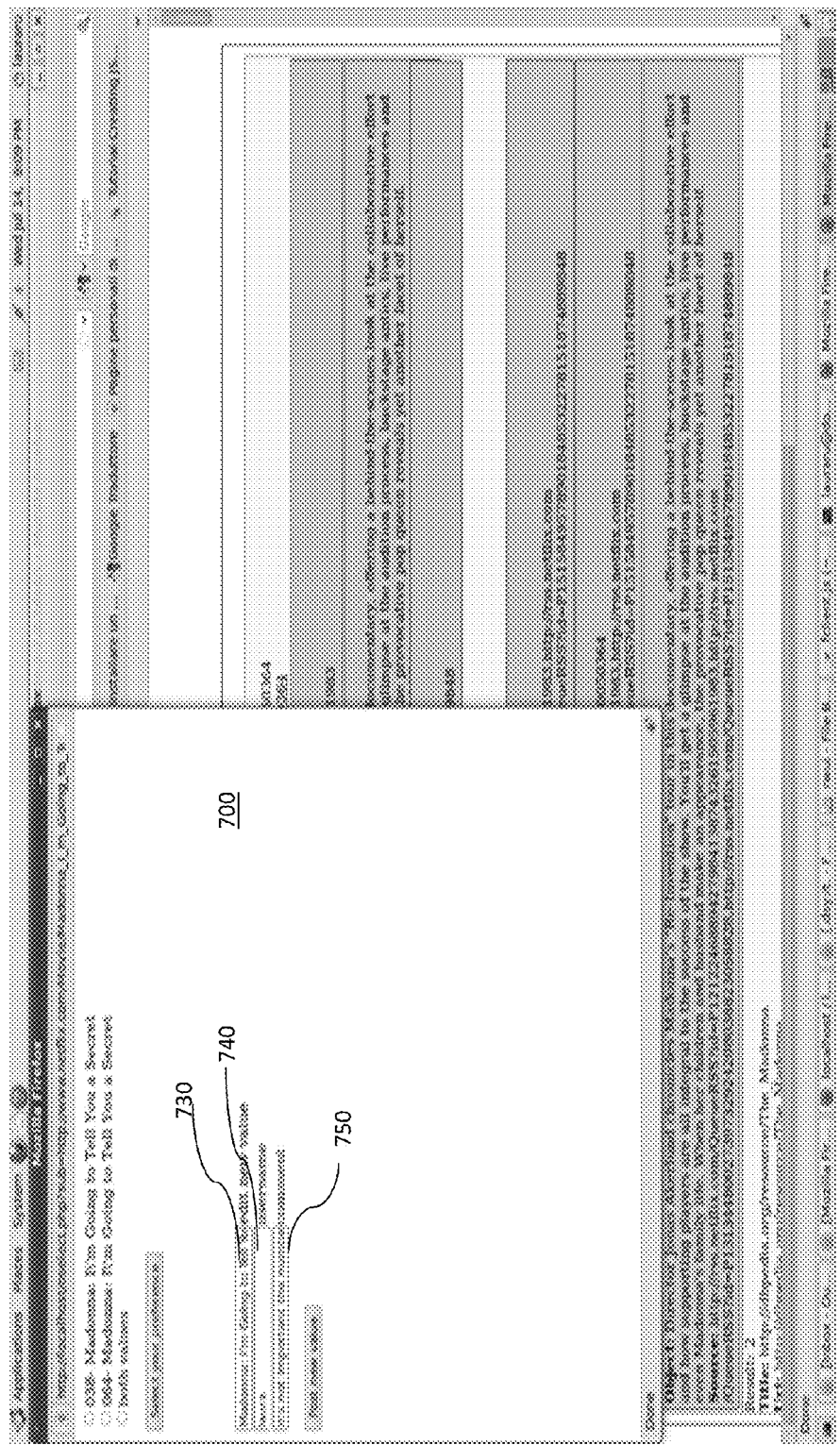

FIG. 8 shows that after applying the changes, only the preferred value 610 is kept. FIG. 9 shows a different example where the predicate "http://purl.org/rss/1.0/title" has two different values, Object 910: "142—Madonna: I'm Going to Tell you a Secret" and Object 920: "038—Madonna: I'm Going to Tell You a Secret." FIG. 10 shows that after the drag-and-drop the user is again presented with screen 700. Here, the user decides that, instead of selecting one of the two values, he/she wants to replace both values with a new value, and also add an optional comment about what motivated the change. Accordingly, in screen 700 the user enters the new value in box 730, the user's name in box 740 and an optional comment in box 750. These values will be entered once the user selects "Post new value."

Figure 11:
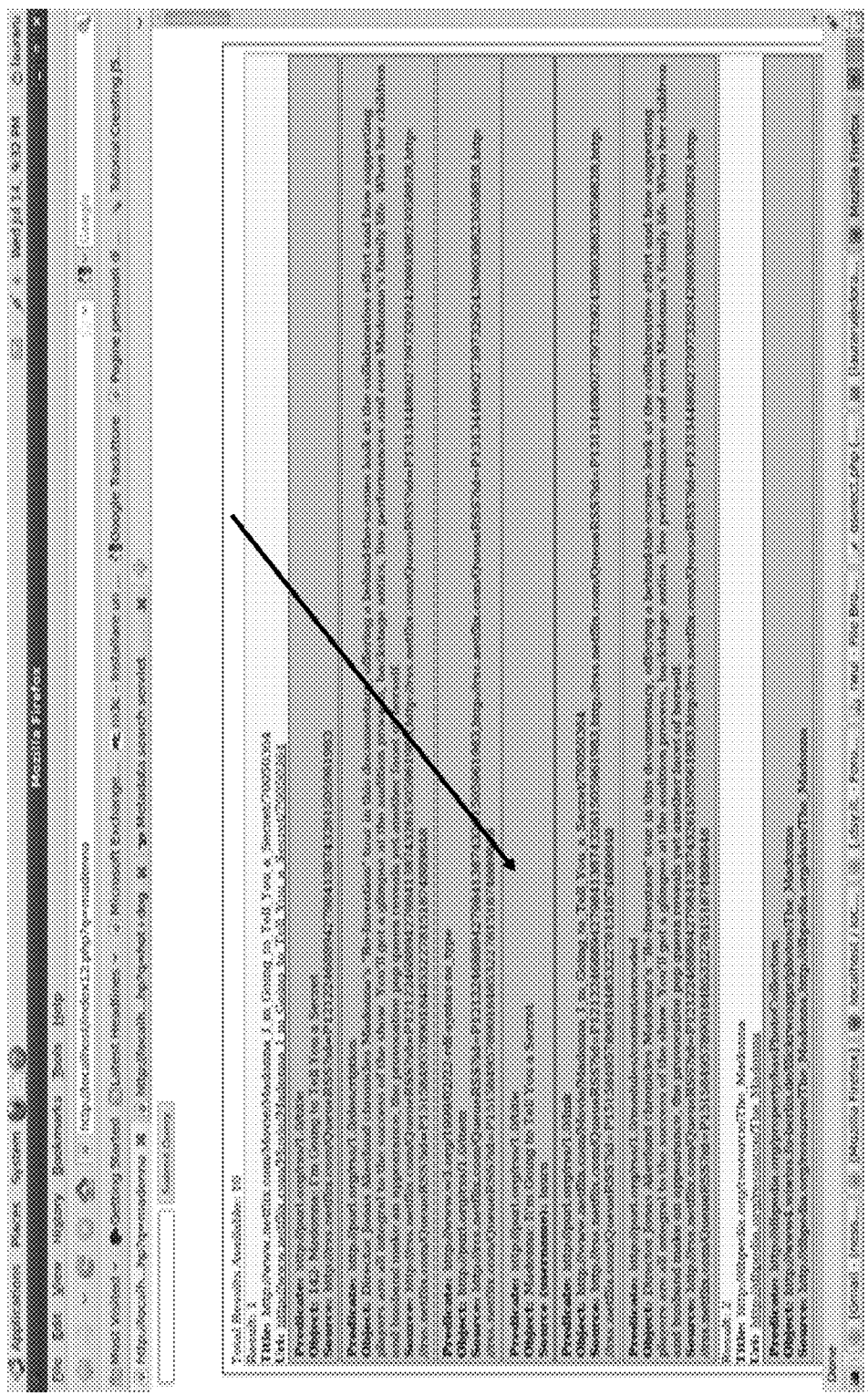

FIG. 11 shows the search results page after the change has been made, where both values have been removed and a new value was added, with the source identifying the person who made the change.

Figure 12:
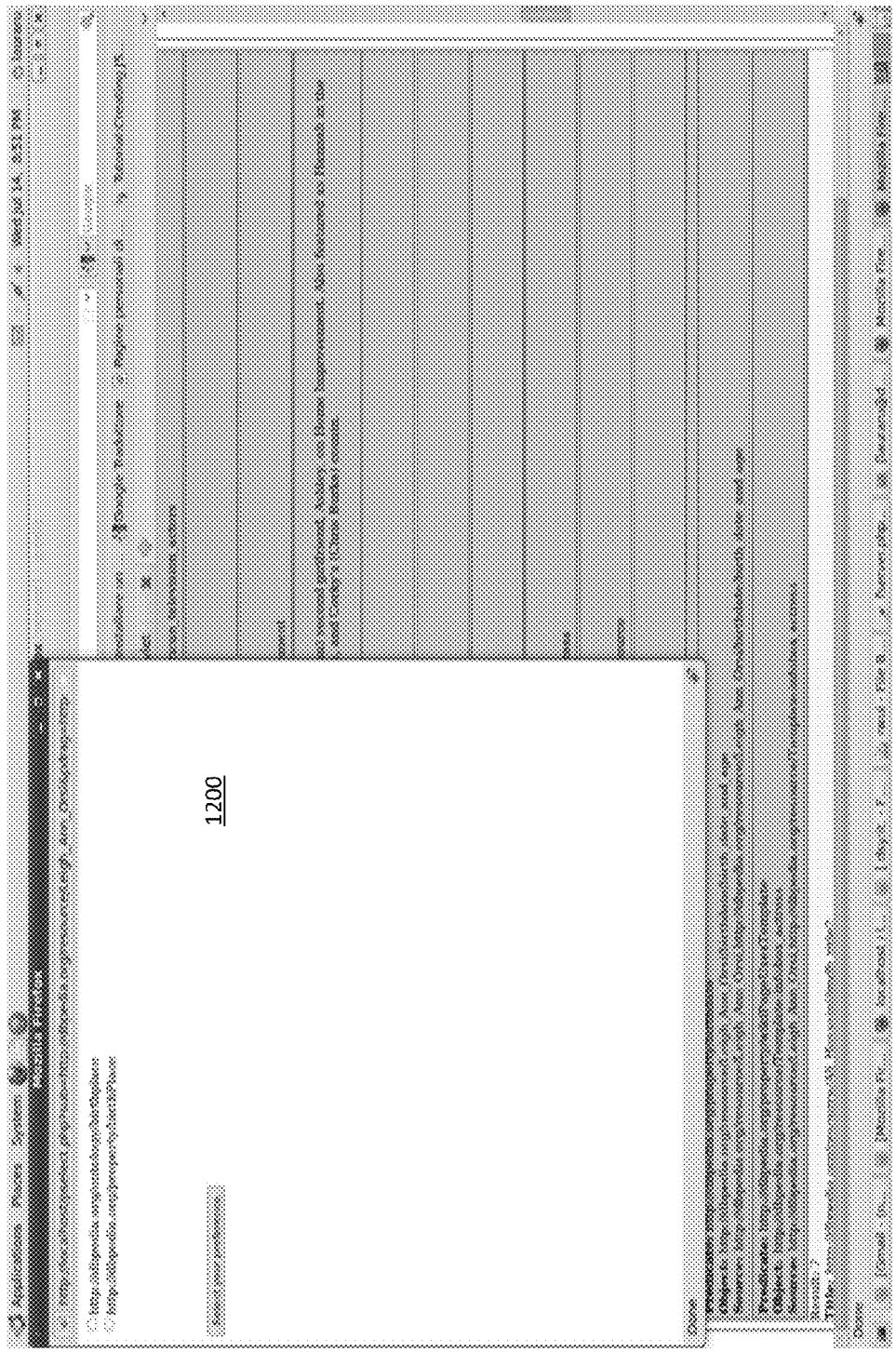

FIG. 12 shows a case where the attribute values to be merged are equal (not shown) and the difference is only in the predicate. In this case, the user makes the choice for the preferred predicate. Note that the screen 1200 in this case does not have the "Post new value" option in screen 700.

Figure 14:
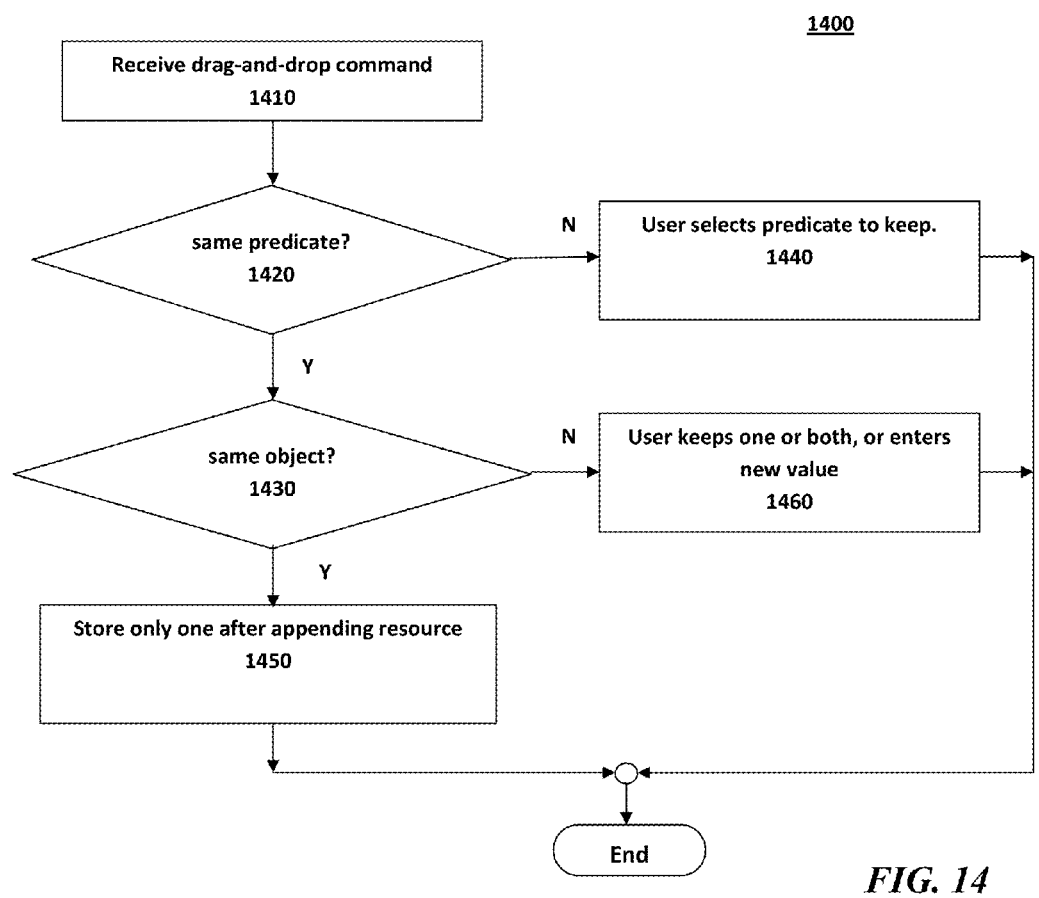
FIG. 14 is a flow chart of a method according to an embodiment of the present invention.

The flowchart 1400 of FIG. 14 presents the different alternatives implemented according to embodiments of the present invention. In step 1410 the user's edit in the form of a drag-and-drop command is received. If the results involved in the drag-and-drop have the same predicate as determined in 1420, then the system must determine in step 1430 if they have the same object. If so, then in step 1450 only one of the results is kept after merging the objects.

If, however, the two objects are different, then in step 1460, the system presents an interface 700 to the user for the user to select which of the two (or both) results to keep. Alternatively, in this same interface 700 the user is able to input an entirely new value and a comment.

If the predicates are not the same, as determined in decision 1420, the user is presented with an interface 900 where the user is able to select which of the predicates to keep.

Figure 13:
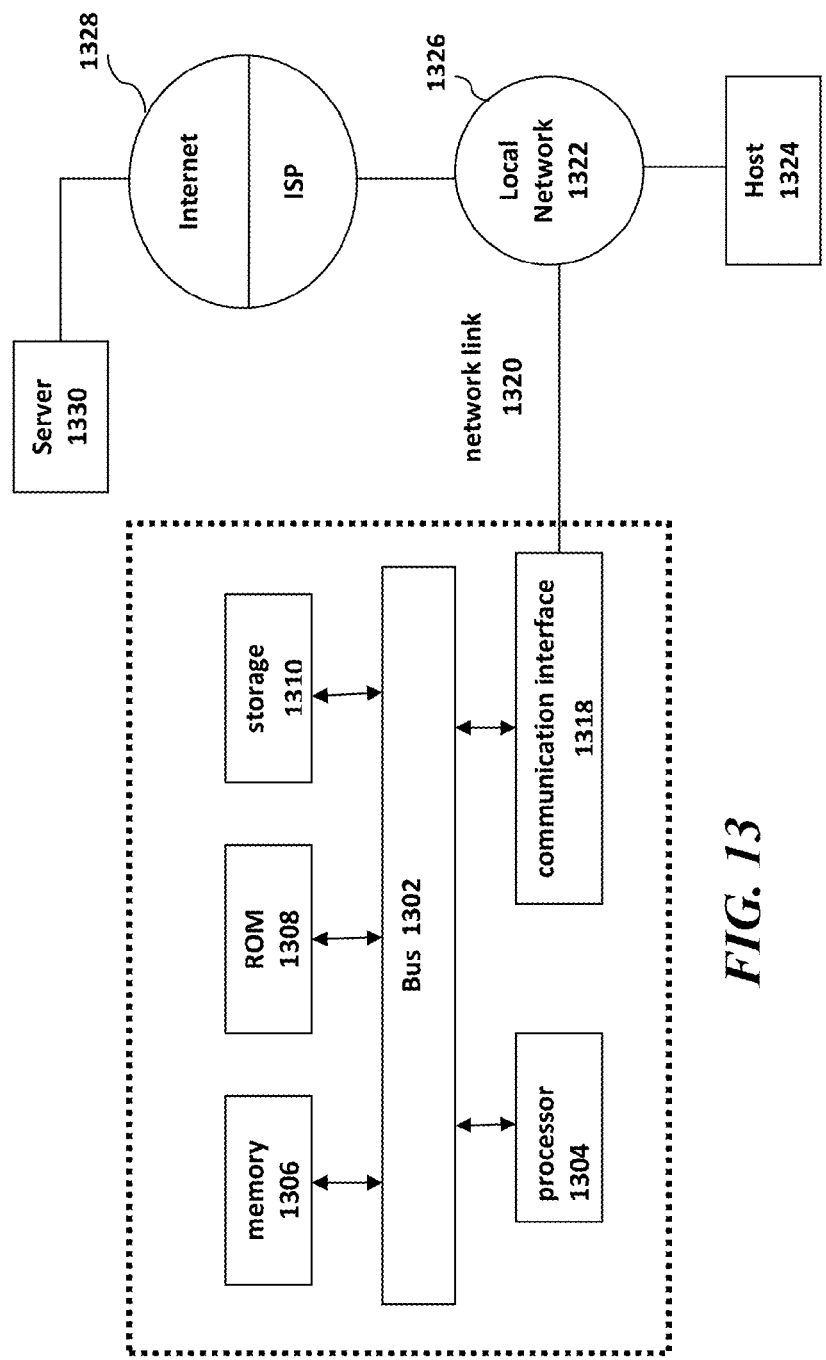
FIG. 13 is a high level block diagram showing an information processing system according to another embodiment of the invention.

Referring now to FIG. 13 there is shown a high-level block diagram illustrating an information processing system 1300 upon which an embodiment of the present invention may be implemented. System 1300 includes a bus 1302 or other communication mechanism for communicating information, and one or more processors, such as processor device 1304 coupled with bus 1302 for processing information. System 1300 also includes a main memory 1306, such as a random access memory (RAM) or other dynamic storage device, coupled with bus 1302 for storing information and instructions to be executed by processor device 1304 for carrying out the steps in the flow chart of FIG. 4.

System 1300 can be a content server. Content servers include any network device that is configured to provide content over a network to another computing device. Content servers may further host a variety of social networking sites, including, but not limited to Flicker, Twitter, Facebook, LinkedIn, and personal user sites (such as blogs, vlogs, online dating sites, and so forth). Content servers may also host a variety of non-social networking sites, including, but not limited to various business sites, educational sites, dictionary sites, encyclopedia sites, wilds, financial sites, government sites, and the like.

Content servers may further provide a variety of services that include, but are not limited to, web services, third-party services, audio services, video services, email services, IM services, SMS services, VOIP services, calendaring services, photo services, or the like. Content may include text, images, audio, video, or the like.

Devices that may operate as a content server include desktop computers, multiprocessor systems, microprocessor-based or programmable consumer electronics, network PCs, servers, and the like.

Memory 1306 stores logic for performing the method steps discussed with respect to FIG. 4. Main memory 1306 also may be used for storing temporary variables or other intermediate information during execution of instructions to be executed by processor device 1304. System 1300 further includes, inter alia, a read only (ROM) memory 1308 or other static storage device, coupled with bus 1302 for storing static information and instructions for processor device 1304. A storage device 1310, such as a magnetic disk or optical disk, is provided and coupled with bus 1302 for storing information and instructions.

In an embodiment of the present invention, computer system 1300 is used for implementing the interactive interface for object search. According to one embodiment of the invention, the interface is provided by system 1300 in response to processor device 1304 executing one or more sequences of one or more instructions contained in memory 1306.

System 1300 also includes a communication interface 1318 providing a two-way communication coupling with a network link 1320 that is connected to a local network 1322. Examples of a communications interface 1318 may include a modem, a network interface (such as an Ethernet card), a communications port, a PCMCIA slot and card, etc. Software and data transferred via communications interface 1318 are in the form of signals which may be, for example, electronic, electromagnetic, optical, or other signals capable of being received by communications interface 1318. These signals are provided to communications interface 1318 via a communications path (i.e., channel). The communications interface 1318 further is enabled to receive input 1340 from the computer user in response to presenting the SRP 1328.

Network link 1320 typically provides data communication through one or more networks to other devices. Network link 1320 may provide a connection through local network 1322 to a host computer 1324 or to a web browser providing access, through the Internet to an Internet services provider 1328.

In this document, the terms "computer program medium," "computer usable medium," and "computer readable medium" are used to generally refer to media such as main memory and secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium.

Thus, a method, a non-transitory computer readable storage medium, and information processing system for annotating graphs to allow quick loading and analysis of very large graphs has been described. Various changes and modifications may be made in carrying out the present invention without departing from the spirit and scope thereof. Insofar as those changes and modifications are within the purview of the appended claims, they are to be considered as part of the present invention.

It is to be understood, that the examples given in FIGS. 2 through 12 are just an illustration of the general working of the present invention and that only features relevant for the understanding of it are shown. Numerous specific details have been set forth by way of exemplary embodiments in order to provide a more thorough description of the present invention. It will be apparent, however, to one skilled in the art, that the present invention may be practiced without these specific details. In other instances, well-known features have not been described in detail so as not to obscure the invention. The preferred embodiments of the inventions are described herein in the Detailed Description, Figures and Claims. Unless specifically noted, it is intended that the words and phrases in the specification and claims be given the ordinary and accustomed meaning as understood by those of skill in the applicable art. If any other meaning is intended, the specification will specifically state that a special meaning is being applied to a word or phrase.

Therefore, while there has been described what are presently considered to be embodiments of the invention, it will understood by those skilled in the art that other modifications can be made within the spirit of the invention. The above descriptions of embodiments are not intended to be exhaustive or limiting in scope. It should be understood that the invention is not limited to the embodiments described above, but rather should be interpreted within the full meaning and scope of the appended claims.

We claim:

1. A method for editorial curation of search results, comprising using a processor device performing:
   receiving a search results page rendered in response to a search query;
   receiving user edits comprising changes to objects in the search results page;
   determining whether the user edits should be applied globally;
   applying the user edits to the search results page globally when it is determined that said user edits are to be applied globally; and
   applying the user edits locally when it is determined that said user edits are not to be applied globally.

2. The method of claim 1 further comprising: storing the user edits.

3. The method of claim 1 wherein receiving the user edits comprises:
   receiving a drag-and-drop request indicating a duplicate object; and
   wherein applying the user edits comprises:
      generating an interface wherein the user can input a selection of the duplicate object to drop; and
      removing the duplicate object selected by the user.

4. The method of claim 1 wherein receiving the user edits comprises receiving a merge request indicating equivalent objects; and
   wherein applying the user edits comprises merging the equivalent objects.

5. The method of claim 1 further comprising verifying that the user is authorized to provide edits.

6. The method of claim 2 further comprising using the user edits to learn automated disambiguation of the objects using machine-learning techniques.

7. The method of claim 3 further comprising:
   generating an interface wherein the user can input a comment to be associated with the drag-and-drop;
   receiving the comment from the user; and
   displaying the comment with results of the drag-and-drop.

8. A system for editorial curation of search results, comprising:
   a memory with instructions stored therein;
   a processor device, operably coupled with said memory to execute the instructions from the memory, causing the system to perform:
      receiving a search results page rendered in response to a search query;
      receiving user edits comprising changes to objects in the search results page;
      determining whether the user edits should be applied globally;
      applying the user edits to the search results page globally when it is determined that said user edits are to be applied globally; and
      applying the user edits to the search results page locally when it is determined that said user edits are not to be applied globally.

9. The system of claim 8 further comprising a storage for storing the user edits.

10. The system of claim 8 further comprising an interface for accepting user input; wherein the user edit comprises a drag-and-drop request indicating a duplicate object; and wherein applying the user edits comprises:
    generating the interface wherein the user can input a selection of the duplicate object to drop; and
    removing the duplicate object selected by the user.

11. The system of claim 8 wherein the user edit comprises a merge request indicating equivalent objects; and wherein applying the user edits comprises merging the equivalent objects.

12. The system of claim 8 further comprising verifying that the user is authorized to provide edits.

13. The system of claim 8 further comprising using the user edits to learn automated disambiguation of the objects using machine-learning techniques.

14. A computer program product comprising a computer readable storage medium storing instructions which, when executed by a computer, cause the computer to perform steps of:
    receiving a search results page rendered in response to a search query;
    receiving user edits comprising changes to objects in the search results page;
    determining whether the user edits should be applied globally;
    applying the user edits to the search results page globally when it is determined that said user edits are to be applied globally; and
    applying the user edits to the search results page locally when it is determined that said user edits are not to be applied globally.

* * * * *